July 20, 1965
R. S. JAY
3,195,735
DETACHABLE STRUCTURE AND JOINT THEREFOR
Filed March 2, 1962
2 Sheets-Sheet 1
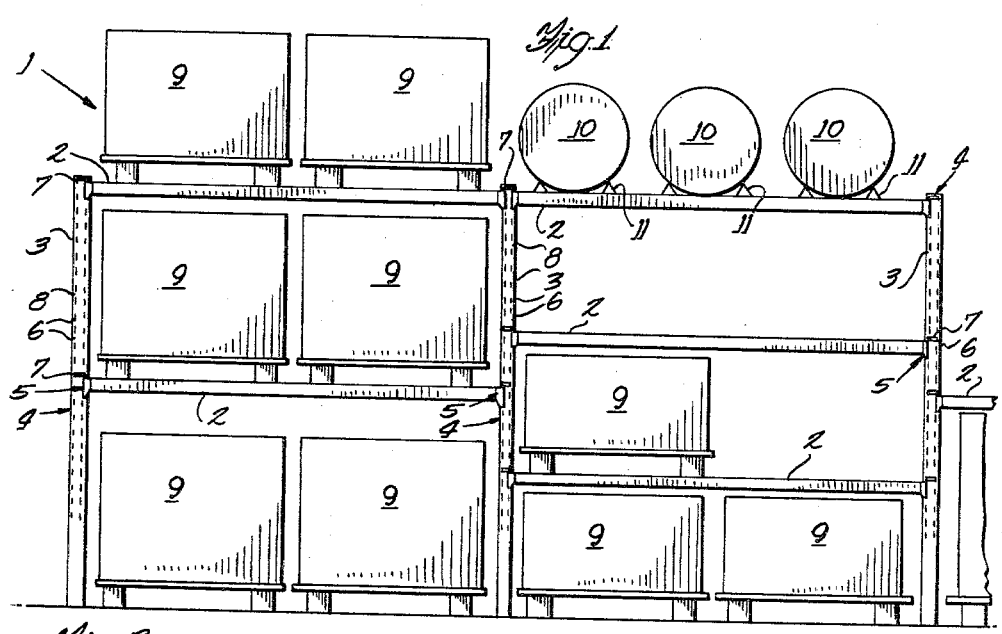
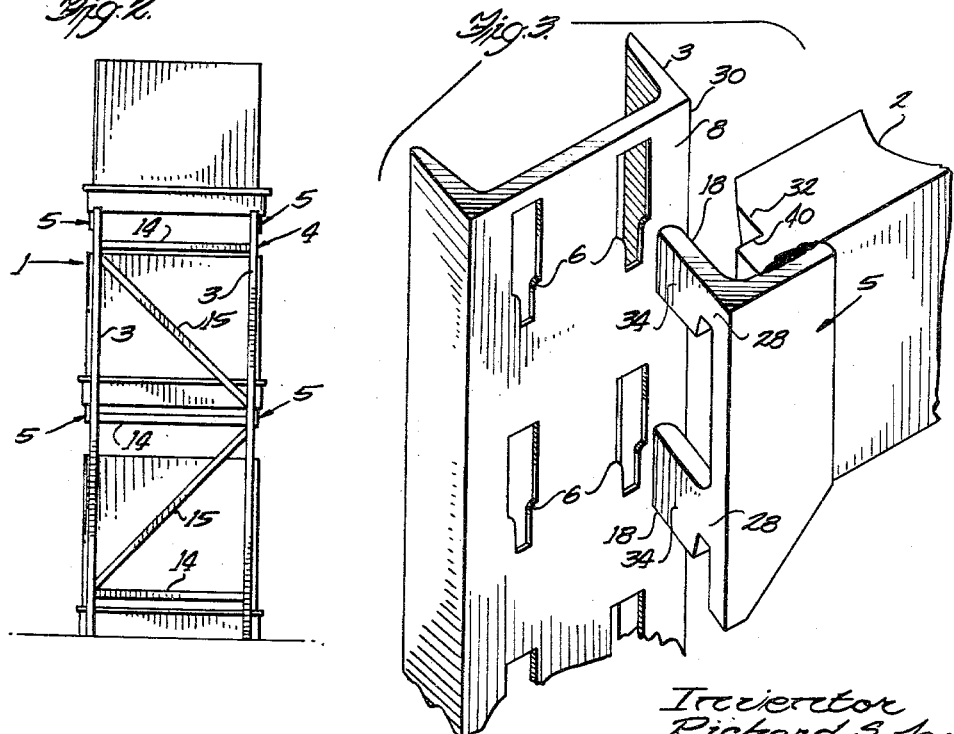
Inventor
Richard S. Jay
Dominik, Knight & North
Attorneys July 20, 1965
R. S. JAY
3,195,735
DETACHABLE STRUCTURE AND JOINT THEREFOR
Filed March 2, 1962
2 Sheets-Sheet 2
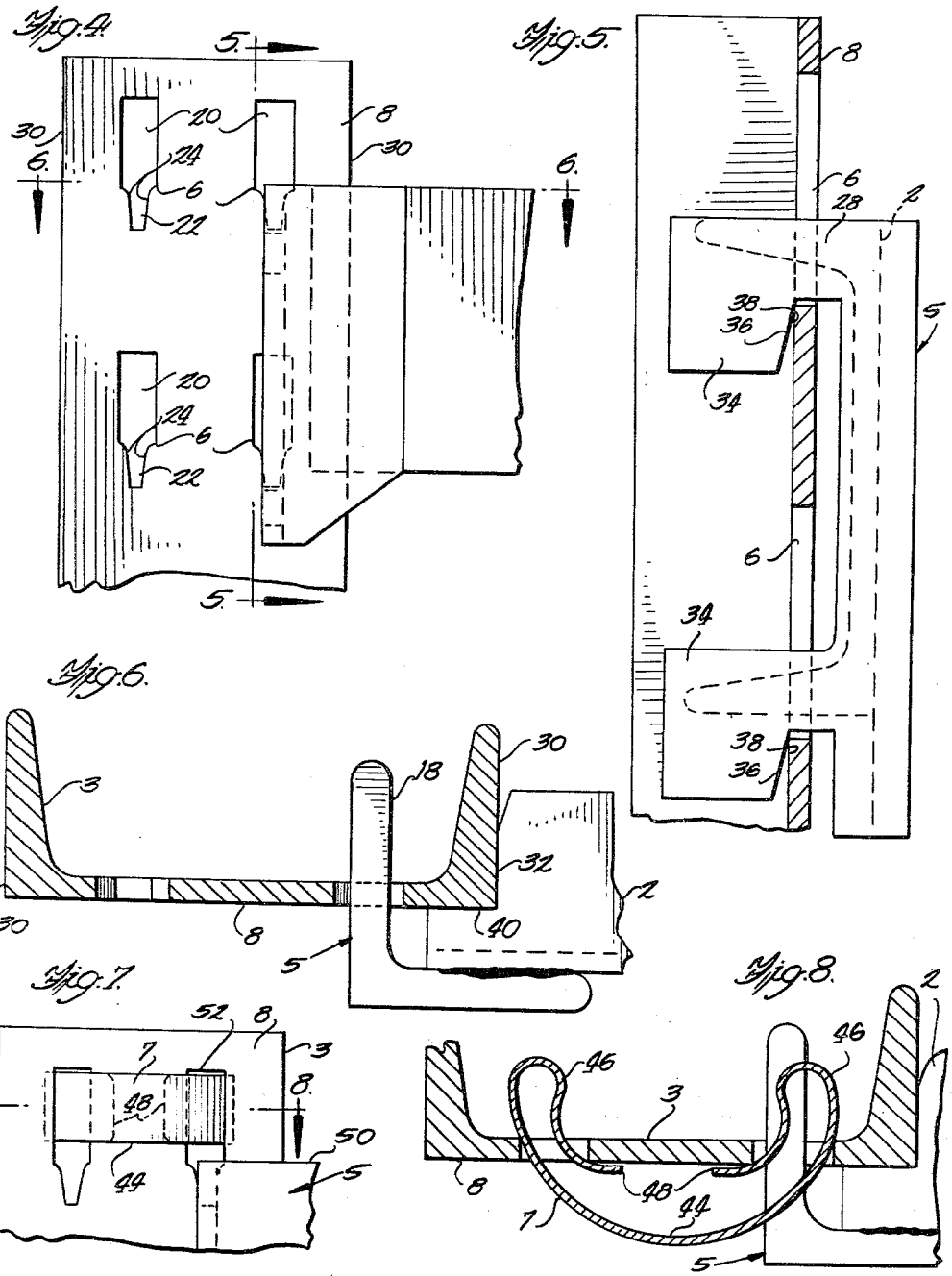
Inventor
Richard S. Jay
Dominik, Lazar & North
Attorneys United States Patent Office 3,195,735
Patented July 20, 1965

3,195,735
DETACHABLE STRUCTURE AND JOINT THEREFOR
Richard S. Jay, Evanston, Ill., assignor to Jarke Manufacturing Company
Filed Mar. 2, 1962, Ser. No. 177,015
2 Claims. (Cl. 211—148)

The present invention relates to a prefabricated structure and more particularly relates to such a structure and the manner of joining the component parts thereof whereby such operations as assembly, disassembly, modification, and adjustment are facilitated. For convenience, such a structure and the manner of joining its components are respectively hereafter referred to as a "demountable structure" and as a "joint." A demountable structure including one or more of such joints is especially well adapted for use in modular construction wherein a series of like subassemblies are joined one to another to provide a structural unit of desired size, such as industrial and commercial storage racks and shelving of modular character in connection with which the invention is now described by way of example but not limitation.

Fork lift trucks of various specific types are used in connection with present day materials handling techniques. The fork lift trucks enable the use of vertical storage space. Storage racks of various types have been developed to allow vertical storage of a variety of different materials whereby the fork lift trucks can place materials in storage, or withdraw materials from storage, at any one of the various vertical levels provided by the racks. Such storage racks allow storage or withdrawal from the "middle" of the vertical row without the inconvenience of first removing materials on top of the desired package. The materials and packages thus stored and handled are of a wide variety of shapes, sizes, and weights. For example, many materials (e.g. fasteners, small springs, liquids, granulated matter) are packaged in drums while other materials are palletized.

It is desired that the storage racks be demountable, i.e. capable of adjustment or modification, preferably to change the vertical spacing between shelves to thereby accommodate different size packages. It is also desired that such racks be interchangeable in any given storage facility whereby the rack space can be expanded and contracted as need dictates. A modular construction has been found advantageous in reducing the number of parts required and in promoting interchangeability, especially where lift trucks are used, as the modular aspect makes it easier to provide appropriate aisles for the passage of the trucks.

It has been experienced that fork lift trucks can accidentally dislodge portions of the storage rack by inadvertent blows with the forks or the package being handled. Some types of demountable storage racks are particularly susceptible to accidental dislodgement, thus producing a safety hazard of sorts.

It is an object of the invention to provide a demountable storage rack structure and a joint therefor of enhanced safety and of improved demountable character.

An object of the invention comprehends the provision of a demountable structure and a joint between the components thereof which facilitates assembly, disassembly, modification and adjustment of the structure.

Another object of the invention is to provide a demountable storage rack structure and joint therefor which facilitates assembly and disassembly of the structure and which also permits easily changing the space between the members constituting the shelves of the rack.

Still another object of the invention is to provide a demountable storage rack and joint therefor which is especially adapted for use in the storage of palletized loads which are transported to and from the structure by a fork-lift truck or the like.

A further object of the invention is to provide a demountable storage rack and joint therefor which is especially adapted for use in the storage of palletized loads which are transported to and from the structure by a fork-lift truck or the like, wherein the shelving members are guarded against accidental dislodging by a blow from the forks of a lift truck.

The invention comprehends achieving the foregoing objects alone or in combination.

The invention in its preferred form comprises a demountable joint for use in temporary and permanent structures. A preferred embodiment of the joint features a resilient member such as a retaining spring which is positioned to prevent motion between the two structural or load-carrying members at the joint.

The joint preferably further includes a vertical column in which are a plurality of vertically aligned equally spaced apart slots shaped somewhat like an inverted keyhole. A horizontal beam is preferably connected to the column by a pair of tabs or keys which are secured to the beam and which fit into a pair of vertically adjacent keyholes. The beam is restrained from twisting by using two keys to fit the keyholes. The keys coact with the keyholes to draw the beam and column into proper relative positions during assembly.

The retaining spring is fitted into the keyhole above the key so that accidental blows will not dislodge the beam.

Other objects, advantages and features will become apparent from the following description read in conjunction with the annexed drawings wherein:

FIG. 1 is a front elevation assembly view of a preferred embodiment of the demountable structure.

FIG. 2 is a side elevation of the embodiment of FIG. 1.

FIG. 3 is an enlarged exploded representation of the preferred embodiment of the beam and column, including details of the beam tabs and corresponding slot.

FIGS. 4, 5, and 6 are enlarged illustrations of the assembled beam, beam tab, column, and keyhole or slot, as seen respectively in front elevation, side cross section, along 5—5 of FIG. 4, and top cross section along 6—6 of FIG. 4.

FIGS. 7 and 8 are enlarged assembly views of a preferred embodiment of a resilient member such as a spring connected to the beam and column of FIGS. 4-6 as seen in front elevation and top cross section along 8—8 of FIG. 7, respectively.

Throughout the figures, the same reference number refers to the same component. FIGS. 4-8 relate to features of a joint.

*The assembled demountable structure*

FIGS. 1 and 2 represent the details of an assembled demountable structure 1 which includes a plurality of horizontally extending beams 2 which are connected between vertical columns 3. The vertical columns are portions of the frame assembly 4 which is hereinafter described with particular reference to FIG. 2. A connector means 5 is secured to the end of each beam for establishing a demountable connection with the columns by engaging selected slots 6 in the face 8 of the column. Each beam is connected between two columns. A retaining means such as the spring 7 (FIGS. 7 and 8) is removably engaged with a portion of the slots in which the connector means are disposed whereby the retaining means serves to prevent motion of the beam relative to the column as hereinafter described with reference to FIGS. 7 and 8. A plurality of loads such as palletized packages 9 and the barrels 10 are supported on the assembly between fore and aft beams 2. Inverted angles 11 may be provided to prevent the barrels from rolling. The angles may be detachably secured to the beams by any suitable means such as self-tapping screws or the like. Other types of shelving, such as plywood or other sheet materials can be supported on the beams whereby loose materials or small parts can be stored thereon.

Referring now to FIG. 2, the frames 4 comprise a pair of the columns 3 arranged in fore and aft relationship so that the slots in the face 8 thereof are on the outside of each frame whereby the connector means 5 can be readily engaged with the slots. The beams 2 are connected between a pair of such frames, whereby a structure resembling a rectangular parallelepiped is obtained. The columns 3 on each frame are maintained in parallel spaced apart relationship by a truss-type structure that includes horizontal members 14 and diagonal members 15. The horizontal and diagonal members 14, 15 are preferably of channel shape and are welded at each end to the corresponding one of the columns.

In review, FIGS. 1 and 2 represent an assembly which includes a plurality of the frames 4 which are connected together by the beams 2 which engage appropriate slots formed in the columns 3. A pair of columns are used in the construction of each frame. The columns are arranged in fore and aft relation, and a pair of beams arranged in similar fore and aft relation are used to connect two frame assemblies together. Preferably, upper and lower pairs of fore and aft arranged beams are used to provide a rigid structure, as illustrated when reading FIGS. 1 and 2 together. Any number of beam pairs may be assembled between the upright frames 4 to accommodate the height of the stored load. Moreover, a plurality of frames can be connected in modular fashion by the employment of the beam and column arrangement described herein.

One manner of providing the modular construction involves punching two parallel rows of the slots in the face 8 of each of the columns. In this fashion a beam can extend in both directions outwardly of the frame in which the particular column is incorporated. This is most prominently illustrated in the middle column of FIG. 1. The slots are formed in a particular fashion and equally spaced for the reasons which will appear below in connection with FIGS. 3–8. Thus, one module of the demountable structure contemplated by the invention includes a pair of frame assemblies which are horizontally spaced apart by at least four beams, the beams being arranged in upper and lower and fore and aft relationship as represented respectively in FIGS. 1 and 2. Moreover, the retaining means 7 is preferably included to safeguard against accidental dislodging of a beam by impact from unexpected sources such as the fork of a fork lift truck or accidental engagement by a load during the course of placing or removing a load in a rack. When the size requirements of the loads change, then the vertical spacing between the horizontal beams can be changed. Moreover, additional modules can be added by connecting additional fore and aft arranged horizontal beams between the end of one module and an additional frame assembly.

*Connector means for removably securing the beam and column*

FIGS. 3–6 represent the preferred manner for removably securing the beam to the column. The column 3 is preferably a channel member in the web portion of which are punched the slots 6. The slots are preferably punched at uniform intervals and are arranged in two rows along the face of the column. The face 8 of the column for the present purposes is defined by the outwardly disposed portion of the channel web. The spacing of the slots is such as to match the spacing of the beam tabs 18 of the connector 5. The connector 5 is advantageously formed by punching the tabs 18 out of one leg of an angle iron and welding the other leg on the face of the web of the channel used to define the beam. The channel is most clearly seen in FIG. 5. A multiple choice of locations for placement of the beam along the face of the column is thus provided. Moreover, the equal spacing of the slots 6 enables connecting two tabs into the slots in order to support the beam, thus providing additional strength as well as additional opposition to twisting of the beam out of the slots. It will be observed that the orientation of the axis of the beam tabs 18 is perpendicular to the face of the beam channel. Mutually perpendicular cam surfaces, hereinafter described, are provided on the walls of the slots and the tabs 18 to draw the beam against the column laterally and fore and aft.

The upper area 20 of the slots 8 is overly large to permit easy entry of the tabs 18; the lower portion 22 of the slots is shaped with inclined walls 24 defining a cam means to engage the necked-down portion 28 of the tab 18 with an interference fit. Further, location of the slots in each row with respect to the edge 30 of the columns (that is, with respect to the outside of the flange of each column channel member) is arranged to draw edge 32 of the beam snugly against the flange 30 of the column responsive to coaction between the cam means 24 and the neck 28 which forces the beam into place. In the preferred embodiment, the neck 28 of the beam is forced down into the lower end 22 of the slot by a sharp blow, as delivered by a hammer or the like. The tab 18 is spaced from the beam edge 32 (see FIGS. 4 and 6) an amount to permit simultaneous engagement, respectively, with the inclined walls 24 and the column flange 30.

The tabs 18 have an enlarged end 34 mounted to the rear of and upon the necked-down portion 28. In this fashion, as best seen in FIGS. 3 and 5, a hook-like contour is arranged, whereby the beam is hooked into engagement with the column, the enlarged end hooking against the rear of the column web portion as best seen in FIG. 5. The enlarged end 34 has a cam means such as an inclined edge 36 which engages the back edge 38 of the slot to draw the beam edge 40 against the face 8 of the column. The beam is thus drawn squarely against the column securing it rigidly in two directions.

In review, it will be observed that the means for connecting the beam to the column provides a demountable structure. The connector means 5 is advantageously formed from an angle to the end that, in the preferred embodiment, a pair of hook like projections 18 are provided with a spacing therebetween to match the equal spacing of the slots. Moreover, various sloping and inclined surfaces on the connector means and the slot (24, 36) serve to draw the beam and the column into proper relationship in the course of assembly. The rows of slots 6 are spaced appropriately from the edge 30 of the column so that the end of the beam 2 abuts the corresponding side (here the flange of the column channel) of the column. The various inclined surfaces thus define a cam means for positioning the beam laterally and fore and aft of the column members in the frame.

As seen in FIGS. 4 and 5, when the beam is assembled to the column and the neck disposed in the lower portion of the slot 22, the slot upper region 20 is left substantially open. The retaining means 7, preferably comprising a resilient spring member, is advantageously positioned in the upper region 20 in such fashion as to oppose motion of the beam vertically in the slot while at the same time still providing a demountable structure. The preferred embodiment and manner of placing the retaining means is now described.

*The retaining means*

Referring now to FIGS. 7 and 8, there is shown a resilient spring member constituting the removable retaining means 7 of FIG. 1. The retaining means preferably comprises a spring clip made up of heat treated spring steel which is snapped into place to fill the upper area 20 of the slot in the channel. The presence of this clip limits the upper travel of the tab 18 because the clip is rigid in the direction necessary to oppose such motion, that is, the clip is rigid or substantially rigid in the longitudinal direction of the column. Either a single beam or two beams at the same level can be retained by the clip.

The clip is preferably formed in a U-shaped configuration having smaller internal U-shaped portions at the inside of the end of the legs of the larger U. A convenient finger grip is thus provided by the bow portion 44. End loops, the smaller U-shaped resilient portions, collectively denoted as 46, provide double material thickness to receive and oppose loads during impact. The ends 48 are angled to serve as forward stops, thus maintaining correct placement in the slots. Inward compression of the clip permits entry in the slots 20, whereupon they are resiliently engaged with the sides of the slot, the spring being resilient in the horizontal direction. As previously mentioned, the spring is substantially rigid in the vertical direction and serves to oppose the motion of the beam tab in the slot.

As best seen in FIG. 7, the spring is slightly less in length along the longitudinal axis of the column than the length of the space between the top 50 of the connector means 5 and the upper end 52 of the slot, whereby the spring is easily placed in the slot with an irreducible minimum of mechanical interference due to, for example, the beam not being forced far enough down into lower portion 22 of the slot.

The spring clip retaining means enhances the safety of the structure when considering the dangers of inadvertent dislodging of the beam due to impact by a load or fork of a lift truck. At the same time, the spring clip does not detract from the demountable characteristic of the structure.

Additional matters

In the preferred embodiment, the column is formed of a structural member which provides a flat straight sided face 8. A channel advantageously accomplishes this, at the same time providing a convenient means for receiving the horizontal and diagonal frame braces 14, 15 between the channel legs. However, the invention contemplates using other shapes and cross sections of the column as well as other shapes and cross sections of the beams. As to the beams, it is again preferred to employ channel members because the fore and aft relation of the beams provides a total beam cross-section having the well known and highly efficient I beam cross section. As best seen in FIG. 2, the beams are preferably arranged in fore and aft relation along the same horizontal plane.

Although the invention has been described with respect to providing a column having slots therein to be engaged by the connecting means on a beam, the invention also comprehends reversing the disposition of such parts so that the beam tabs 18 extend from the column and the slots 6 are defined in the web of the beam. However, in such case, the slots and the beam tabs would be turned upside down from the position shown in FIG. 3 and the spring 7 would be disposed underneath the beam since it would be hanging from the column instead of being hooked thereto.

An advantageous feature of the preferred embodiment is a construction whereby standard structural shapes are employed for the load bearing members. To this end channel members are advantageously employed for the beams and the columns and angle members appropriately formed are used as the connecting means which includes the tabs. Moreover, angles are advantageously employed for the struts in the respective frame assemblies.

A further advantage of the preferred embodiment is the ability to relocate the beams whereby the vertical spacing between shelves can be altered. The relocation and arrangement of beams can take place because the beam web (assuming a channel or I beam shape) is spaced outwardly of the column, as illustrated in FIG. 5, for example. In this fashion access is had for the purpose of inserting the tabs or removing the tabs, that is, for connecting the beam or removing it, from a direction outwardly from the column and necessarily outwardly of the frame assembly of which the column ordinarily forms an integral part. This is an advantage over many prior art devices which require that the beam connector be slipped down over various types of vertical guides associated with such column members as may be employed. It also offers an advantage in that shelves can be completely removed to create aisles or other passages when occasion requires.

The demountability of the entire structure is enhanced by reason of the resilient character of the safety retainer inasmuch as a simple outward motion is sufficient to dislodge it. Despite the ease of removing the retaining means from the column by moving the retainer outwardly from the column, it is still securely locked for purposes of resisting accidental vertical blows or other dislodging effects.

It is presently preferred to manufacture the demountable structure from a welded steel frame, but other materials such as aluminum, magnesium, reinforced plastic, or the like can be employed. Additionally, the frames 4 and manner of assembling the connector means 5 to the beam may include riveting, the use of various cementing and brazing materials, as well as the preferred embodiment of welding.

While the invention has been described in considerable detail in the foregoing specification, it is to be understood that various changes may be made in its embodiment without departing from or sacrificing any of the advantages hereinafter claimed.

I claim:

1. A joint in a demountable structure comprising: a vertical column of channel cross section having a web disposed between a pair of flanges and two vertical rows of equally spaced mounting slots formed in said web, each of said mounting slots being enlarged at its upper end and having a smaller tapered lower portion forming a first camming surface; a horizontal beam of channel cross section having a web disposed between a pair of flanges, each of said flanges being correspondingly notched so as to abut said web and one of said flanges of said vertical column; tab means of L-shaped cross section having one of its legs formed to define a pair of hook-like members which are spaced apart by the same distance as said mounting slots formed in said web of said vertical column, each of which has a tapered portion forming a second camming surface, and the other one of its legs secured to said web of said horizontal beam at its end in a position such that said vertical column is forcibly urged within said notched portion of said flanges of said horizontal beam by the cooperative action of said first and said second camming surfaces when said hook-like members are engaged in said mounting slots; said slots being of greater length longitudinally of said column than said tab means, thereby leaving a space in the upper end between the tab means and one end of the slot engaged therewith; and a spring member being made of a resilient strip material and having a main body portion with a U-shaped configuration and U-shaped reversed end loops disposed generally parallel with the main body portion, said spring means serving to lock said beam against vertical movement in the engaged mounting slots by reason of the parallel portions of the spring means main body portion and the end loops being inserted in said space in the upper end of a pair of said mounting slots to form an abutment for said beam.

2. A demountable structure comprising: a pair of horizontally spaced apart vertical columns of channel cross section having a web disposed between a pair of flanges and vertical rows of equally spaced mounting slots formed in said web, each of said mounting slots being enlarged at its upper end and having a smaller tapered lower portion forming a camming surface; an upper and a lower horizontal beam connected between said columns, said beams being of channel cross section having a web disposed between a pair of flanges, each of said flanges at the opposite ends of said beam being correspondingly notched so as to abut a portion of said web and a portion of one of said flanges of one of said vertical columns; tab means at the ends of each of said beams for securing said beams between said columns each of said tab means being of L-shaped cross section having one of its legs formed to define a pair of hook-like members which are spaced apart by the same distance as said mounting slots formed in said webs of said vertical columns, and which have a tapered portion forming a camming surface and the other one of its legs secured to said web of said horizontal beam at its end in a position such that a vertical column is forcibly urged against said notched portion of said flanges of said horizontal beam by the cooperative action of said first and second camming surfaces when said hook-like members are engaged in said mounting slots; said slots being of greater length longitudinally of said column than said beam tabs, thereby leaving a space in the upper end between the beam tabs and one end of the slot engaged therewith, and a spring member being made of a resilient strip material and having a main body portion with a U-shaped configuration and U-shaped reversed end loops disposed generally parallel with the main body portion, said end loops being angled at their extremities to serve as forward stops when the spring member is compressively positioned in adjacent slots, said spring member serving to lock the beam against vertical movement in the engaged slots by reason of the parallel portions of the spring means main body portion and the end loops being inserted in said space in the upper end of a pair of said mounting slots to form an abutment for said beam.

References Cited by the Examiner

UNITED STATES PATENTS

| | | | |
|---|---|---|---|
| 936,167 | 10/09 | Rittler | 189—35 |
| 1,816,715 | 7/31 | Barnhart. | |
| 2,765,087 | 10/56 | Weinbaum. | |
| 2,893,567 | 7/59 | Steele. | |
| 2,925,920 | 2/60 | Skubic | 211—148 X |
| 2,984,363 | 5/61 | Lang et al. | |
| 2,999,570 | 9/61 | Seiz | 189—36 |
| 3,095,975 | 7/63 | Cassel et al. | 211—148 |
| 3,096,108 | 7/63 | Baybarz | 211—148 X |

FOREIGN PATENTS

| | | |
|---|---|---|
| 2,224,821 | 10/59 | Australia. |
| 875,999 | 5/53 | Germany. |

CARL W. TOMLIN, *Primary Examiner.*

WALTER A. SCHEEL, *Examiner.*